US012415947B2

(12) United States Patent
Zhao et al.

(10) Patent No.: US 12,415,947 B2
(45) Date of Patent: Sep. 16, 2025

(54) SINGLE-PHASE RETARDED ACID SYSTEMS USING AMINO ACIDS

(71) Applicant: Schlumberger Technology Corporation, Sugar Land, TX (US)

(72) Inventors: Haiyan Zhao, Sugar Land, TX (US); Murtaza Ziauddin, Katy, TX (US); Philippe Enkababian, Abu Dhabi (AE); Temiloluwa Yusuf, Sugar Land, TX (US); Patrice Abivin, Houston, TX (US); Abraham Ryan, Abu Dhabi (AE)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/689,334

(22) PCT Filed: Sep. 23, 2022

(86) PCT No.: PCT/US2022/044553
§ 371 (c)(1),
(2) Date: Mar. 5, 2024

(87) PCT Pub. No.: WO2023/049360
PCT Pub. Date: Mar. 30, 2023

(65) Prior Publication Data
US 2024/0271034 A1 Aug. 15, 2024

Related U.S. Application Data

(60) Provisional application No. 63/248,223, filed on Sep. 24, 2021.

(51) Int. Cl.
*E21B 43/27* (2006.01)
*C09K 8/60* (2006.01)
*C09K 8/74* (2006.01)

(52) U.S. Cl.
CPC .............. *C09K 8/74* (2013.01); *C09K 8/602* (2013.01); *E21B 43/27* (2020.05); *C09K 2208/30* (2013.01)

(58) Field of Classification Search
CPC ...... C09K 8/74; C09K 8/602; C09K 2208/30; E21B 43/27
See application file for complete search history.

(56) References Cited

U.S. PATENT DOCUMENTS

| 2,485,529 | A | 10/1949 | Cardwell |
|---|---|---|---|
| 3,681,240 | A | 8/1972 | Fast |
| 3,826,312 | A | 7/1974 | Richardson et al. |
| 3,920,566 | A | 11/1975 | Richardson et al. |
| 4,140,640 | A | 2/1979 | Scherubel |
| 4,368,136 | A | 1/1983 | Murphey |
| 4,420,414 | A | 12/1983 | Valone |
| 4,466,893 | A | 8/1984 | Dill |
| 4,702,848 | A | 10/1987 | Payne |
| 4,703,797 | A | 11/1987 | Djabbarah |
| 4,730,676 | A | 3/1988 | Luers |
| 4,747,975 | A | 5/1988 | Ritter |
| 4,807,703 | A | 2/1989 | Jennings, Jr. |
| 5,120,471 | A | 6/1992 | Jasinski |
| 5,220,960 | A | 6/1993 | Totten |
| 5,310,002 | A | 5/1994 | Blauch |
| 5,327,973 | A | 7/1994 | Jennings, Jr. |
| 5,547,022 | A | 8/1996 | Juprasert |
| 5,773,024 | A | 6/1998 | Unger |
| 5,990,051 | A | 11/1999 | Ischy |
| 6,117,364 | A | 9/2000 | Vorderbruggen |
| 6,196,318 | B1 | 3/2001 | Gong |
| 6,436,880 | B1 | 8/2002 | Frenier |
| 7,148,184 | B2 | 12/2006 | Francini |
| 7,237,608 | B2 | 7/2007 | Fu |
| 7,350,572 | B2 | 4/2008 | Fredd |
| 7,603,261 | B2 | 10/2009 | Tardy |
| 7,615,516 | B2 | 11/2009 | Yang |
| 7,635,028 | B2 | 12/2009 | Li |
| 7,696,393 | B2 | 4/2010 | Rivers |
| 7,774,183 | B2 | 8/2010 | Tardy |
| 7,833,947 | B1 | 11/2010 | Kubala |
| 7,915,205 | B2 | 3/2011 | Smith |
| 8,163,102 | B1 | 4/2012 | MacDonald |
| 8,551,926 | B2 | 10/2013 | Huang |
| 8,580,047 | B1 | 11/2013 | MacDonald |

(Continued)

FOREIGN PATENT DOCUMENTS

| CN | 105670599 | 6/2016 |
|---|---|---|
| CN | 110564398 | 12/2019 |

(Continued)

OTHER PUBLICATIONS

Search Report and Written Opinion of International Patent Application No. PCT/US2022/044553 dated Jan. 18, 2023, 6 pages.
Al-Ghamdi, A. H.; Mahmoud, M. A.; Wang, G.; Hill, A. D.; Nasr-El-Din, H. A. "Acid Diversion by Use of Viscoelastic Surfactants: The Effects of Flow Rate and Initial Permeability Contrast." SPE 142564, Dec. 2014, SPE Journal, pp. 1203-1216.
Baker, B. D. et al., "Stimulation Practices Using Alcoholic Acidizing and Fracturing Fluids for Gas Reservoirs", SPE-4836-MS presented at the SPE European Spring Meeting, 1974, 7 pages.
Bonn, M.; Bakker, H. J.; Rago, G.; Pouzy, F.; Siekierzycka, J. R.; Brouwer, A. M.; Bonn, D. "Suppression of Proton Mobility by Hydrophobic Hydration" J. Am. Chem. Soc. 2009, 131, 17070-17071.

(Continued)

*Primary Examiner* — Silvana C Runyan
(74) *Attorney, Agent, or Firm* — Jeffrey D. Frantz

(57) ABSTRACT

Treatment of hydrocarbon formations using single-phase aqueous acid blends that contain arginine is described herein. The single-phase aqueous fluid includes one or more strong acid molecules and arginine in water, wherein the one or more strong acid molecules are present in a concentration range of 7.5 wt % to 28 wt %, based on the weight of the aqueous fluid, and arginine is present in a molar ratio of arginine to the one or more strong acid molecules that is from 1:100 to 1:5.

17 Claims, 3 Drawing Sheets

(56) References Cited

U.S. PATENT DOCUMENTS

| | | |
|---|---|---|
| 8,940,106 B1 | 1/2015 | MacDonald |
| 9,034,806 B2 | 5/2015 | Gurmen |
| 9,085,975 B2 | 7/2015 | Abad |
| 9,376,611 B2 | 6/2016 | Berry |
| 9,573,808 B2 | 2/2017 | Jiang et al. |
| 9,796,490 B2 | 10/2017 | Jiang et al. |
| 9,809,716 B2 | 11/2017 | Beuterbaugh et al. |
| 9,920,606 B2 | 3/2018 | Jiang et al. |
| 10,035,944 B2 | 7/2018 | Purdy et al. |
| 10,131,831 B2 | 11/2018 | Rimassa et al. |
| 10,378,325 B2 | 8/2019 | Panga et al. |
| 10,703,957 B2 | 7/2020 | Al-Yami et al. |
| 10,767,474 B2 | 9/2020 | Feng |
| 10,787,606 B2 * | 9/2020 | Weider ............ C09K 8/74 |
| 10,954,432 B2 | 3/2021 | Panga et al. |
| 10,982,133 B2 | 4/2021 | Purdy et al. |
| 11,091,689 B2 | 8/2021 | Daeffler |
| 11,098,241 B2 | 8/2021 | Purdy |
| 11,168,244 B2 | 11/2021 | Phan |
| 2002/0023752 A1 | 2/2002 | Qu |
| 2002/0147114 A1 | 10/2002 | Dobson |
| 2004/0009880 A1 | 1/2004 | Fu |
| 2004/0129418 A1 | 7/2004 | Jee |
| 2005/0124500 A1 | 6/2005 | Chen |
| 2006/0042797 A1 | 3/2006 | Fredd |
| 2006/0102349 A1 | 5/2006 | Brady |
| 2006/0180308 A1 | 8/2006 | Welton |
| 2007/0235189 A1 | 10/2007 | Milne |
| 2007/0293404 A1 | 12/2007 | Hutchins |
| 2008/0139412 A1 | 6/2008 | Fuller |
| 2008/0200353 A1 | 8/2008 | Dahayanake |
| 2008/0269081 A1 | 10/2008 | Lin |
| 2008/0289828 A1 | 11/2008 | Hutchins |
| 2008/0314594 A1 * | 12/2008 | Still .......... C09K 8/72 |
| | | 166/307 |
| 2009/0247431 A1 | 10/2009 | Gupta |
| 2010/0010106 A1 * | 1/2010 | Crews .......... B01J 13/0069 |
| | | 516/135 |
| 2010/0022418 A1 | 1/2010 | Milne |
| 2010/0224365 A1 | 9/2010 | Abad |
| 2010/0243242 A1 | 9/2010 | Boney |
| 2010/0248996 A1 | 9/2010 | Sawdon |
| 2010/0331223 A1 | 12/2010 | Li |
| 2011/0036583 A1 | 2/2011 | Willberg |
| 2012/0238479 A1 | 9/2012 | Choudhary |
| 2013/0025870 A1 | 1/2013 | Berry |
| 2013/0032345 A1 | 2/2013 | Freese |
| 2013/0261032 A1 | 10/2013 | Ladva |
| 2013/0327531 A1 | 12/2013 | Dahayanake |
| 2014/0116708 A1 | 5/2014 | Wadekar |
| 2014/0166291 A1 | 6/2014 | Friesen |
| 2014/0166589 A1 | 6/2014 | Hicks |
| 2014/0171345 A1 | 6/2014 | Steiner |
| 2014/0174742 A1 | 6/2014 | Mirakyan |
| 2014/0212006 A1 | 7/2014 | Zhao |
| 2014/0246198 A1 | 9/2014 | Pandya |
| 2014/0256604 A1 | 9/2014 | Wadekar |
| 2014/0329725 A1 | 11/2014 | Karale |
| 2014/0367100 A1 | 12/2014 | Oliveira |
| 2015/0034315 A1 | 2/2015 | Jiang |
| 2015/0034318 A1 | 2/2015 | Jiang et al. |
| 2015/0080271 A1 | 3/2015 | De Wolf |
| 2015/0114647 A1 * | 4/2015 | Jiang ............ C09K 8/74 |
| | | 166/305.1 |
| 2015/0200147 A1 | 7/2015 | Lien |
| 2015/0240147 A1 | 8/2015 | Jiang et al. |
| 2015/0260021 A1 | 9/2015 | Reyes |
| 2015/0322762 A1 | 11/2015 | Varadaraj |
| 2015/0344771 A1 | 12/2015 | Jiang |
| 2016/0024370 A1 | 1/2016 | Ba geri |
| 2016/0025895 A1 * | 1/2016 | Ziauddin ............ G01V 20/00 |
| | | 702/11 |
| 2016/0146964 A1 | 5/2016 | Badri |
| 2016/0237340 A1 | 8/2016 | Pandya |
| 2016/0298024 A1 * | 10/2016 | Panga ............ C09K 8/845 |
| 2017/0037304 A1 | 2/2017 | Rimassa |
| 2017/0267918 A1 | 9/2017 | Daeffler et al. |
| 2018/0244981 A1 | 8/2018 | Panga et al. |
| 2018/0244982 A1 | 8/2018 | Yakovlev et al. |
| 2018/0273834 A1 | 9/2018 | Qiu et al. |
| 2018/0282613 A1 * | 10/2018 | Blackbourn ............ C09K 8/74 |
| 2019/0010385 A1 | 1/2019 | Sayed et al. |
| 2019/0194528 A1 | 6/2019 | Purdy et al. |
| 2019/0292440 A1 | 9/2019 | Purdy |
| 2020/0224085 A1 | 7/2020 | Purdy et al. |
| 2020/0224086 A1 | 7/2020 | Purdy et al. |
| 2020/0318009 A1 * | 10/2020 | Purdy ............ C09K 8/528 |
| 2020/0399530 A1 | 12/2020 | Zakaria et al. |
| 2021/0002543 A1 | 1/2021 | Jin |
| 2021/0130680 A1 | 5/2021 | Purdy |
| 2021/0189226 A1 * | 6/2021 | Purdy ............ C09K 8/74 |
| 2021/0198561 A1 | 7/2021 | Purdy et al. |
| 2021/0253936 A1 | 8/2021 | Purdy |
| 2021/0277302 A1 | 9/2021 | Qiu |
| 2021/0380872 A1 | 12/2021 | Daeffler |
| 2023/0257645 A1 | 8/2023 | Daeffler |
| 2023/0279284 A1 | 9/2023 | Qiu |
| 2024/0309266 A1 | 9/2024 | Fernandez Del Valle |

FOREIGN PATENT DOCUMENTS

| | | |
|---|---|---|
| EP | 2524017 | 6/2015 |
| KR | 20200108408 | 9/2020 |
| RU | 2247833 | 3/2005 |
| WO | 2000019062 A1 | 4/2000 |
| WO | 2004005672 A1 | 1/2004 |
| WO | 2006136262 A1 | 12/2006 |
| WO | 2009077958 A1 | 6/2009 |
| WO | 2011148282 A1 | 12/2011 |
| WO | 2014193546 A1 | 12/2014 |
| WO | 2015020688 A1 | 2/2015 |
| WO | 2015154977 A1 | 10/2015 |
| WO | 2016105996 A1 | 6/2016 |
| WO | 2016164056 A1 | 10/2016 |
| WO | 2017040434 A1 | 3/2017 |
| WO | 2017040553 A1 | 3/2017 |
| WO | 2017040562 A1 | 3/2017 |
| WO | 2018018129 A1 | 2/2018 |
| WO | 2019245983 A1 | 12/2019 |
| WO | 2021126303 A1 | 6/2021 |
| WO | 2023283480 A1 | 1/2023 |
| WO | 2023287746 A1 | 1/2023 |
| WO | 2023102001 A1 | 6/2023 |
| WO | 2023183462 A1 | 9/2023 |
| WO | 2023183465 A1 | 9/2023 |

OTHER PUBLICATIONS

Buijse, "Understanding wormholing mechanisms can improve acid treatments in carbonate formations", SPE Production Facilities, vol. 15, No. 3, 2000, pp. 168-175.

Callahan et al., "Solvation of Magnesium Dication: Molecular Dynamics Simulation and Vibrational Spectroscopic Study of Magnesium Chloride in Aqueous Solution", J. Phys. Chem. A. 2010, 114, 5141-5148.

Chemicalland21, "Lauryl alcohol ethoxlates", http://www.chamicalland21.com/specialtychem/perchem/lauryl%20alcohol%20ethoxylate.htm, Jan. 17, 2015, 5 pages.

Crowe, C.W .; McGowan, G. R.; Baranet, S. E. "Investigation f Retarded Acids Provides Better Understanding of Their Effectiveness and Potential Benefits", SPE 18222, SPE Production Engineering, May 1990, pp. 166-170.

Edward et al., "the Dielectric Increments of Amino Acids", J. Am. Chem. Soc. 1974, 96, 902-906.

Fredd et al., "Influence of transport and reaction on wormhole formation in carbonate porous media", AIChE Journal, vol. 44, No. 9, Sep. 1998, pp. 1933-1949.

Ghommem et al., "Carbonate Acidizing: Modeling, Analysis, and Characterization of Wormhole Formation and Propagation", Journal of Petroleum Science and Engineering, vol. 131, Jul. 2015, pp. 18-33.

(56) References Cited

OTHER PUBLICATIONS

Liu et al., "Wormhole propagation behavior under reservoir condition in carbonate acidizing", Transport in porous Media, vol. 96, Issue 1, Jan. 2013, pp. 203-220.
Lungwitz, B.; Fredd, C.; Brady, M.; Miller, M.; Ali, S.; Hughes, K. "Diversion and Cleanup Studies of Viscoelastic Surfactant-Based Self-Diverting Acid", SPE 86504, SPE International Symposium and Exhibition on Formation Damage Control, Feb. 18-20, 2004, 10 pages.
Mou, J.; Liu, M.; Zheng, K.; Zhang, S. "Diversion Conditions for Viscoelastic-Surfactant-Based Self-Diversion Acid in Carbonate Acidizing" SPE 173898, May 2015, SPE Production Operations, pp. 121-129.
P. M. J Tardy, B. Lecerf, Y. Christanti "An Experimentally Validated Wormhole Model for Self-Diverting and Conventional Acids in Carbonate Rocks Under Radial Flow Conditions" paper SPE 107854, presented at the European Formation Damage Conference held in Scheveningen, The Netherlands, May 30-Jun. 1, 2007; 17 pages.
Panga et al., "Two-Scale Continuum Model for Simulation of Wormholes in Carbonate Acidization", AICHE J. 2005, 51, 3231-3248.
Petrov et al., "An Integrated approach to the treatment of the bottom-hole zone of the formation as a method for intensification of production", Scientific and technical journal Georesources, No. 1,(33), 2010, pp. 7-10.
Scherubel, G. A; Crowe, C. W. "Foamed Acid, A New Concept in Fracture Acidizing" paper SPE 7568, presented at the Annual Fall Technical Conference and Exhibition, Houston, TX, USA, Oct. 1978, 8 pages.
Travalani-Louvisse, A.M. et al., "The use of ethanol in oil well stimulation fluids", Journal of Petroleum Science and Engineering, 1990, 4(3), pp. 257-272.
Wyman, "Dielectric Constant: Ethanol-Diethyl Ether and Urea-Water Solutions between 0 and 50", J. Am. Chem. Soc. 1933, 55, 4116-4121.
Xu et al., "On the Origin of Proton Mobility Suppression in Aqueous Solutions in Amphiphiles", J. Phys. Chem. B. 2013, 117, 15426-15435.
Office Action issued in U.S. Appl. No. 18/691,989 dated Oct. 11, 2024, 22 pages.
Office Action issued in U.S. Appl. No. 18/577,787 dated Nov. 8, 2024, 39 pages.
Examination Report issued in GCC Patent Appl. No. GC 2016-31138 on Jul. 17, 2018; 4 pages.
International Search Report issued in PCT Application PCT/US2016/025967 on Jul. 14, 2016; 3 pages.
Written Opinion issued in PCT Application PCT/US2016/025967 on Jul. 14, 2016; 3 pages.
Office Action issued in U.S. Appl. No. 18/305,765 dated Dec. 21, 2023, 18 pages.
International Search Report and Written Opinion issued in International Patent Appl. No. PCT/US2016/049335 on Nov. 17, 2016; 9 pages.
PCT International Preliminary Report on Patentability; Application No. PCT/US2016/049335; Dated Mar. 15, 2018; 8 pages.
Eurasian Office Action issued in Eurasian Patent Application No. 201890638 (IS15.1123-EA-EAT) on Oct. 2, 2018; 6 pages (with English Translation).
Examination Report issued in related GC Application GC 2016-39640 on Jul. 8, 2021; 5 pages.
Examination Report issued in the related GC Application GC/2016/31967 (IS15.1123-GC-NP) dated Nov. 20, 2018 (4 pages).
Third Examination Report issued in the related GC Application GC/2016/31967 (IS15.1123-GC-NP) dated Feb. 17, 2021, 4 pages.
Eurasian Office Action issued in Eurasian Patent Application No. 201890637 (IS15.1163-EA-EAT) Mar. 27, 2019; 12 pages (with English Translation).
Examination Report issued in the related GC Application GC/2016/31966 (IS15.1163-GC-NP) dated Nov. 26, 2018 (4 pages).
International Search Report and Written Opinion issued in International Patent Application No. PCT/US2016/049538 on Nov. 10, 2016; 10 pages.
International Preliminary Report on Patentability issued in International Patent Application No. PCT/US2018/024439 on Oct. 10, 2019; 11 pages.
Extended European Search Report issued in European Patent Appl. No. 18776307.3 on Dec. 10, 2020; 9 pages.
Exam Report Issued in Qatar Patent Application No. QA/201909/000510 dated Oct. 29, 2023, 5 pages with English translation.
Office Action issued in Kazakhstan Patent Appl. No. 2019/0788.1 on Nov. 2, 2020; 15 pages (with English translation).
International Search Report and Written Opinion issued in International Patent Appl. No. PCT/US2018/024439 on Jul. 12, 2018; 14 pages.
Substantive Exam issued in Saudi Arabian Patent Application No. 519410203 dated May 24, 2022, 10 pages with English translation.
International Search Report and Writtin Opinion issued in the PCT Application No. PCT/US2022/036641 dated Nov. 4, 2022, 13 pages.
Search Report and Written Opinion of International Patent Application No. PCT/US2022/051322 dated Apr. 14, 2023, 7 pages.
Search Report and Written Opinion of International Patent Application No. PCT/US2023/016026 dated Jul. 7, 2023, 8 pages.
Search Report and Written Opinion of International Patent Application No. PCT/US2023/016032 dated Jul. 18, 2023, 9 pages.

* cited by examiner

SINGLE-PHASE RETARDED ACID SYSTEMS USING AMINO ACIDS

CROSS-REFERENCE TO RELATED APPLICATIONS

This patent application is a National Stage Entry of PCT/US2022/044553, filed Sep. 23, 2022, which claims the benefit of U.S. Provisional Patent Application Ser. No. 63/248,223, filed Sep. 24, 2021, which is entirely incorporated herein by reference.

FIELD

This patent application describes methods and apparatus for stimulating hydrocarbon reservoirs. Specifically, methods and materials for acid treating hydrocarbon formations is described.

BACKGROUND

Almost two-thirds of the world's remaining oil reserves are contained in carbonate reservoirs. Carbonate formations have a tendency to be highly heterogeneous, with complex porosity and permeability variations, barriers, and irregular flow paths. In order to increase the productivity of wells in a calcareous formation, a range of stimulation techniques can be applied. One of the most common techniques involves the stimulation of a well with acids.

Acids can be injected into the formation to boost production or increase injectivity in oil and gas fields. Stimulation of carbonate rocks typically involves the reaction between an acid and the minerals calcite ($CaCO_3$) and dolomite [$CaMg(CO_3)_2$] to enhance the flow properties of the rock. The reaction removes solid material from the rock structure into solution, creating openings in the rock formation for fluid flow.

Optimal acid treatment involves finding a balance between acid reacting too quickly with rock materials, thereby depleting before openings can be formed, and acid reacting too slowly, causing uniform dissolution of rock material, not the formation of openings. To manage the extremes, retarded acid systems are commonly used to extend reactivity of acid such that reactive acid can be delivered into the formation before being expended. One common type of retarded acid is emulsified acid, which is formed by suspending small acid droplets in a continuous hydrocarbon phase to form an emulsion. Emulsified acid can slow down the reaction rate between hydrochloric acid (HCl) and carbonate. However, emulsions typically have high viscosity and friction pressure, and are challenging to prepare at the wellsite. Single-phase retarded acid systems do not have the challenges of emulsions, but balancing the reactivity of the acid can be challenging. Single-phase acid systems also commonly result in flowback composition with low pH, for example, from a pH of 0 to 3, which can corrode equipment.

Improved single-phase retarded acid systems are needed for stimulation of carbonate reservoirs.

SUMMARY

Embodiments described herein provide a single-phase aqueous fluid that has one or more strong acid molecules and arginine in water, wherein the strong acid is present at a concentration in a range of 7.5 percentage by weight (wt %) to 28 wt %, based on the weight of the aqueous fluid, and arginine is present in a molar ratio of arginine to the strong acid that is from 1:100 to 1:5.

Other embodiments described herein provide a method of treating a subterranean formation penetrated by a wellbore by preparing a single-phase aqueous fluid having one or more strong acid molecules at a concentration in a range of 7.5 wt % to 28 wt % and arginine in range of concentration such that a molar ratio of arginine to acid is between 1:100 and 1:5 and contacting the subterranean formation with the single-phase aqueous fluid at a pressure less than the fracture initiation pressure.

Other embodiments described herein provide a method of treating a subterranean formation penetrated by a wellbore. The method includes obtaining a single-phase aqueous fluid comprising one or more strong acid molecules at a concentration in a range of 7.5 wt % to 28 wt % and an amino acid mixture, including arginine, in a range of concentration such that a molar ratio of amino acids to acid molecules is from 1:100 to 1:5, and contacting the subterranean formation with the single-phase aqueous fluid at a pressure less than the fracture initiation pressure.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which.

DETAILED DESCRIPTION

Figure 1:
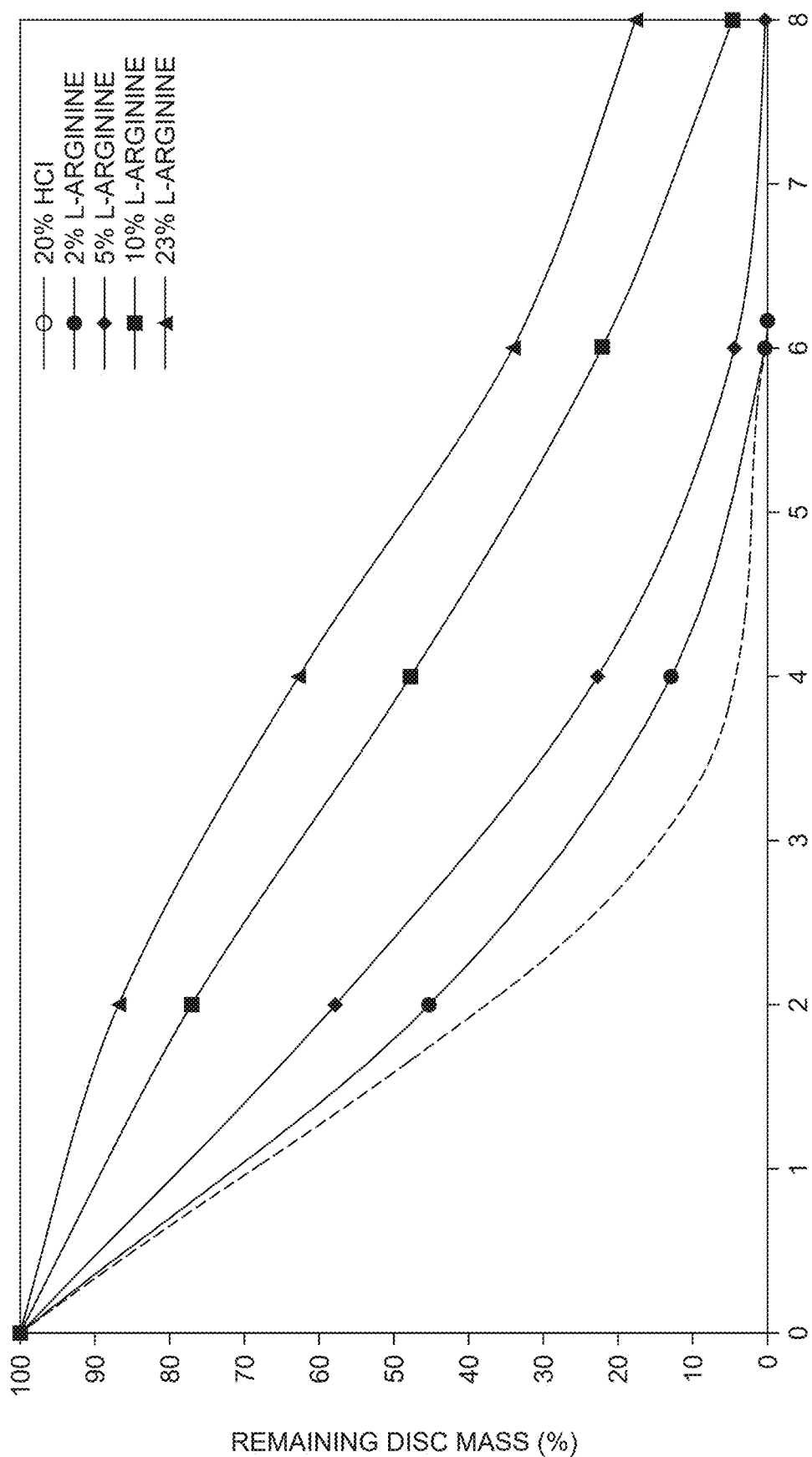
FIG. 1 is a graph showing rotating disc test results of aqueous fluids containing only HCl and L-arginine, in accordance with embodiments of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Blending one or more strong acid molecules with arginine in an aqueous fluid has been found to yield an acid system with reduced reactivity rate that is useful for acid treating acid-susceptible hydrocarbon reservoirs. Arginine is functional as an acid retardant for strong acid molecules such as hydrogen chloride (HCl, also called hydrochloric acid), hydrogen bromide in water (HBr, also called hydrobromic acid), hydrogen iodide (HI, also called hydroiodic acid), hydrogen fluoride in water (HF, also called hydrofluoric acid), sulfuric acid ($H_2SO_4$), nitric acid ($HNO_3$), phosphoric acid ($H_3PO_4$), any alkanesulfonic acid ($RSO_3H$, where R is an alkyl group), any arylsulfonic acid ($ArSO_3$, where Ar is an aromatic or aryl group), or a combination thereof, in water solution. Because it is believed that the amino acid functionality of arginine provides acid retarding functionality, other amino acids, such as valine, serine, aspartate (also called aspartic acid), asparagine, glutamate (also called glutamic acid), glutamine, cysteine, and threonine can also be used in similar concentrations as arginine. Substituted versions of these amino acids can also be used. One or more substitutable hydrogen atoms on any of the above amino acids can be replaced by substituents, which may be, for example, aromatic or aliphatic organic groups such as phenyl groups, smaller alkyl groups, and/or smaller alkenyl groups. A mixture of the amino acids described above can also be used, where the mixture is present in these concentrations. One or more strong acid molecules and arginine (or another amino acid, or a mixture of amino acids), in water solution, form a single-phase aqueous fluid that can be used for acid treatment. The fluids described herein are retarded acid fluids that can be used to penetrate acid-susceptible formations for acid treatment, and provide flowback compositions that are less corrosive than conventional treatment fluids. For example, where conventional treatment fluids generally result in flowback at a pH of 0 to 3, the retarded acid fluids described herein generally provide flowback composition of pH from about 3 to about 5.5, resulting in reduced flowback time.

The strong acid molecule or molecules are generally present in the single-phase aqueous fluid at a concentration in a range of 7.5 wt % to 28 wt %, based on the weight of the single-phase aqueous fluid, and arginine is generally present in a molar ratio of arginine to the one or more strong acid molecules that is from 1:100 to 1:5, such as from 1:75 to 1:10, or from 1:70 to 1:15, for example about 1:47 or 1:19. In some cases, arginine is present in the single-phase aqueous fluid at a concentration of 10 wt %, or 5 wt %, or as low as 2 wt %.

Surfactants can also be used in acid-arginine blends to enhance acid retardation. Surfactants are generally used to modify surface properties of liquids. In the applications described herein, surfactants are generally believed to occupy sites where acid might react with acid-susceptible species in rock formations. Any surfactant that has affinity for acid-susceptible species in rock formations can be used. Such surfactants may be amphoteric, nonionic, cationic, or anionic. Surfactants that can be used include, but are not limited to, betaine-based materials such as erucic amidopropyl dimethyl betaine (EADB) and cocamidopropyl betaine (CAPB); alkyl ammonium bromide materials such as hexadecyltrimethyl ammonium bromide (CTAB, for cetyl trimethyl ammonium bromide) and tetradecyltrimethylammonium bromide (TTAB); and dodecylbenzene sulfonic acid. Combinations of surfactants can be used to tune the effect of acid and alcohol on the acid-susceptible species of the rock formation. The surfactant, or combination of surfactants, is generally added to a mixture of acid and alcohol to complete a single-phase treatment mixture.

Other components can be added to the single-phase acid mixtures described above for use in acid treatment of hydrocarbon formations. Such components include corrosion inhibitors, friction reducers, iron control reagents, diversion agents, viscosifiers, chelating reagents, solvents, clay stabilizers, and calcium inhibitors. These reagents can be added to the mixture neat or dissolved in water or another compatible solvent. For example, such reagents can be added to an alcohol to form a premix, and the premix can then be added to an acid solution to form a single-phase treatment mixture.

The single-phase aqueous mixtures described above can be used as acid treatment compositions with no further additional components, and can be used in a single-step acid treatment process, wherein the single-phase aqueous mixture consisting of water-miscible components and comprising one or more strong acid molecules, arginine (optionally mixed with other amino acids as described above), and a surfactant is pumped into a well to acidify the interior of a hydrocarbon formation adjacent to the well. Additional components can be added to the single-phase aqueous mixture to enhance the properties and performance thereof. Adding these components may result in a multi-phase mixture in some cases, or the mixture may remain single-phase after the additional components are added. Acid treatment mixtures described herein may also be used in multi-step processes that might include pre-treatment operations to flush the formation with flush compositions that may be liquid, gas, or a mixture thereof, and may be aqueous, oleaginous, or a mixture thereof. In some instances, a dilute acid flush may be used prior to acid treatment to remove any unwanted components from the formation prior to acid treatment.

Examples

To evaluate the performance of single-phase aqueous treatment fluids with strong acids and arginine, optionally including surfactants, mass loss rotating disk experiments were conducted. The mass loss experiments used a control fluid of 20 wt % HCl in water to compare to test fluids containing 20 wt % HCl and different concentrations of arginine and different surfactants. The mass loss experiments used marble discs of 1-inch diameter and ¼-inch thickness, with disc mass recorded every three minutes. Coreflow tests were also conducted using limestone cores.

FIG. 1 is a graph showing rotating disc test results of aqueous fluids containing only HCl and L-arginine (compared to an HCl solution). As seen in FIG. 1, adding arginine to a 20 wt % HCl solution results in slower dissolution of a marble disc, indicating acid retardation.

Figure 2:
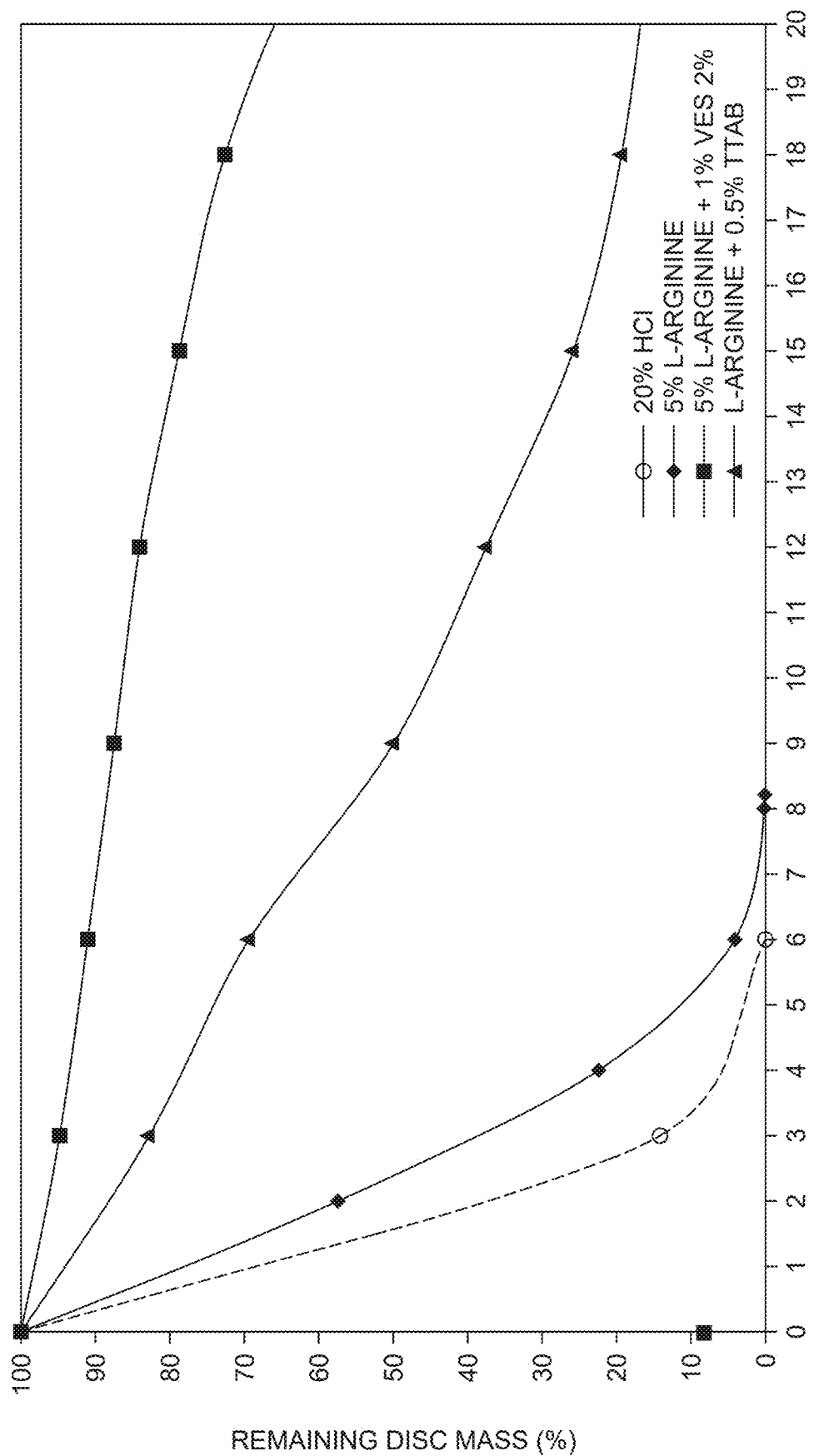
FIG. 2 is a graph showing rotating disc test results of aqueous fluids containing HCl, L-arginine, and different surfactants, in accordance with embodiments of the present disclosure.

FIG. 2 is a graph showing rotating disc test results of aqueous fluids containing HCl, L-arginine, and different surfactants. As shown in FIG. 2, reaction rate of a solution of 20 wt % HCl and 5 wt % L-arginine is further retarded by including 1 wt % VES (viscoelastic surfactant). Also, in FIG. 2, a 20 wt % HCl solution containing 2 wt % L-arginine and 0.5 wt % TTAB reacts more slowly than the 5 wt % L-arginine solution with no surfactant.

Coreflow tests are summarized in Table 1. The coreflow test compared the performance of a 20 wt % HCl solution injected into 1-inch cores with performance of a 20 wt % HCl solution containing 10 wt % L-arginine and 1 wt % EADB injected into 1.5 inch cores. Table 1 indicates pore volume to breakthrough ($PV_{BT}$), which is a volume of injection needed to create wormholes in the core.

TABLE 1

PVBT Values of Retarded and Control Acid Fluids

| Acid System | $PV_{BT}$ |
|---|---|
| 20 wt % HCl | 8.3 |
| Retarded acid (20 wt % HCl, 10 wt % L-arginine, 1 wt % EADB) | 0.25 |

As shown in Table 1, much less (specifically about 90% less) acid treatment fluid volume is needed to create wormholes in the limestone cores using the retarded acid versus the control fluid.

Figure 3:
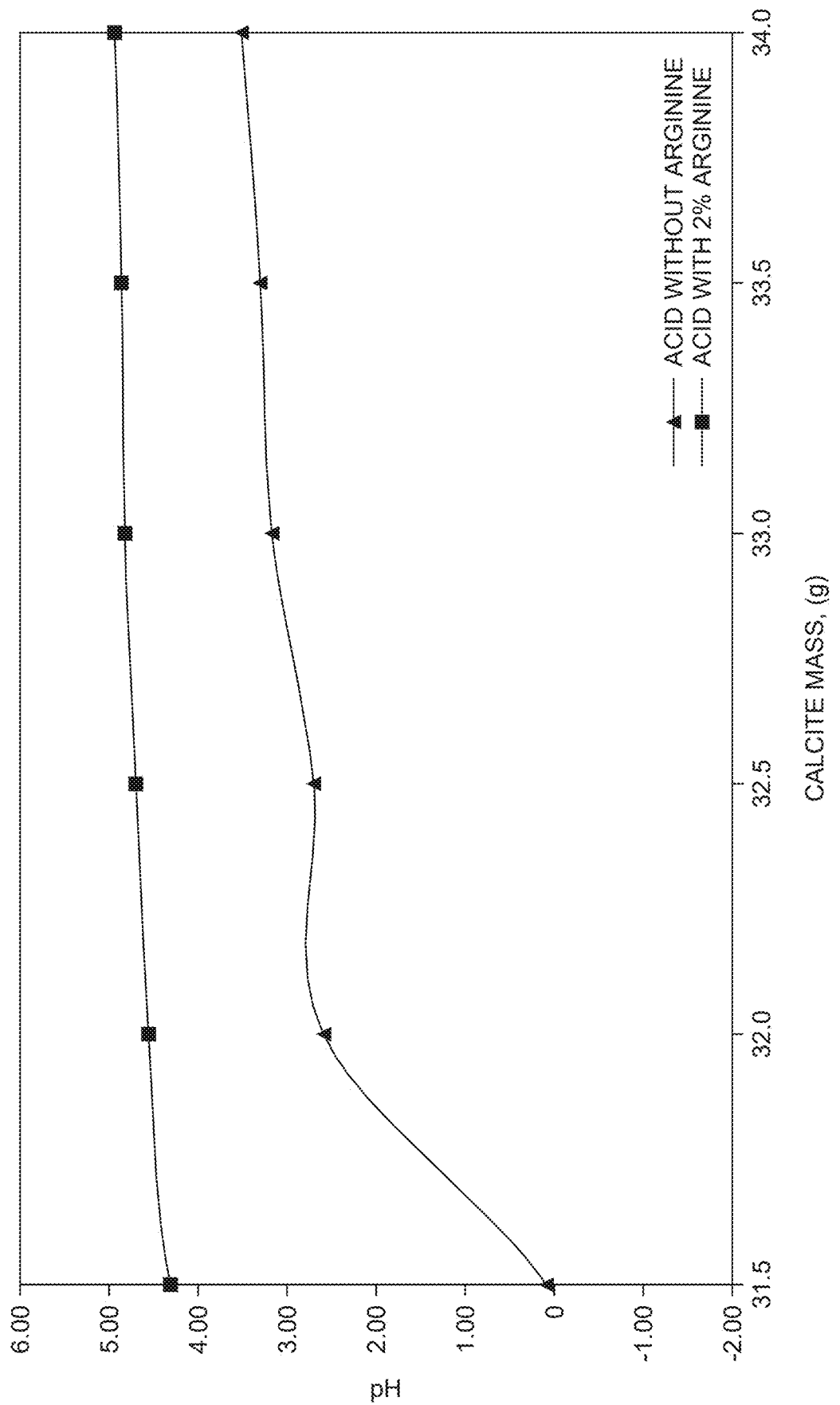
FIG. 3 is a graph showing the pH effect of using arginine in an acid treatment fluid, in accordance with embodiments of the present disclosure.

FIG. 3 is a graph showing the pH effect of using arginine in an acid treatment fluid. As acid is spent in an acid treatment fluid, pH will rise at a rate that indicates how fast the acid is consumed. FIG. 3 compares adding carbonate to a 20 wt % HCl solution, as control, and to a 20 wt % HCl solution containing 2 wt % arginine. As shown in FIG. 3, pH rises quickly with the control fluid and slowly with the arginine-containing fluid, indicating retardation of acid reaction rate. Also notable from the data shown in FIG. 3 is the higher pH of the spent acid. Depending on the mass of calcite added, pH of the 2 wt % arginine solution is 1.5-2 units of pH higher than the arginine-free solution.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A single-phase aqueous fluid for treating a subterranean formation, the single-phase aqueous fluid comprising:
water;
one or more strong acid molecules, wherein the one or more strong acid molecules are present at a concentration in a range of 7.5 wt % to 28 wt %, based on the weight of the single-phase aqueous fluid;
an amino acid component comprising arginine, wherein the amino acid component is present in a molar ratio of the amino acid component to the one or more strong acid molecules that is from 1:70 to 1:19; and
a surfactant having an affinity for acid-susceptible species in the subterranean formation, the surfactant cooperating with the amino acid component to retard an acid reaction rate of the one or more strong acid molecules with the subterranean formation, wherein the surfactant is selected from the group consisting of betaine-based materials, alkyl ammonium bromide materials, dodecylbenzene sulfonic acid, and combinations thereof.

2. The single-phase aqueous fluid of claim 1, wherein the one or more strong acid molecules comprise hydrogen chloride.

3. The single-phase aqueous fluid of claim 1, wherein the one or more strong acid molecules are selected from the group consisting of hydrogen bromide, hydrogen iodide, hydrogen fluoride, sulfuric acid, nitric acid, phosphoric acid, an alkanesulfonic acid, an arylsulfonic acid, and combinations thereof.

4. The single-phase aqueous fluid of claim 1, wherein the surfactant is a viscoelastic surfactant.

5. The single-phase aqueous fluid of claim 1, wherein the surfactant is a cationic surfactant.

6. The single-phase aqueous fluid of claim 1, wherein the amino acid component is present in a molar ratio of the amino acid component to the one or more strong acid molecules that is from 1:47 to 1:19.

7. The single-phase aqueous fluid of claim 1, wherein the surfactant is selected from the group consisting of erucic amidopropyl dimethyl betaine (EADB), cocamidopropyl betaine (CAPB), hexadecyltrimethyl ammonium bromide (CTAB), tetradecyltrimethylammonium bromide (TTAB), dodecylbenzene sulfonic acid, and combinations thereof.

8. The single-phase aqueous fluid of claim 1, wherein the amino acid component comprises arginine and at least one additional amino acid selected from the group consisting of valine, serine, aspartate, asparagine, glutamate, glutamine, cysteine, and threonine.

9. The single-phase aqueous fluid of claim 1 consisting of the water, the one or more strong acid molecules, the amino acid component, the surfactant, and at least one additional component selected from the group consisting of corrosion inhibitors, friction reducers, iron control reagents, diversion agents, viscosifiers, chelating reagents, solvents, clay stabilizers, and calcium inhibitors.

10. The single-phase aqueous fluid of claim 1 consisting of the water, the one or more strong acid molecules, the amino acid component, and the surfactant.

11. The single-phase aqueous fluid of claim 1, wherein the surfactant comprises erucic amidopropyl dimethyl betaine (EADB).

12. A method of treating a subterranean formation penetrated by a wellbore, the method comprising:
obtaining the single-phase aqueous fluid of claim 1; and
contacting the subterranean formation with the single-phase aqueous fluid at a pressure less than a fracture initiation pressure, wherein the surfactant cooperates with the amino acid component to retard an acid reaction rate of the one or more strong acid molecules with the subterranean formation.

13. The method of claim 12, wherein the one or more strong acid molecules is hydrogen chloride.

14. The method of claim 12, wherein the one or more strong acid molecules are selected from the group consisting of hydrogen bromide, hydrogen iodide, hydrogen fluoride, sulfuric acid, nitric acid, phosphoric acid, an alkanesulfonic acid, an arylsulfonic acid, and combinations thereof.

15. The method of claim 12, wherein the surfactant is a viscoelastic surfactant.

16. The method of claim 12, wherein the surfactant is a cationic surfactant.

17. The method of claim 12, wherein the amino acid component is present in the single-phase aqueous fluid in a molar ratio of the amino acid component to the one or more strong acid molecules that is from 1:47 to 1:19.

* * * * *